United States Patent [19]

Arai et al.

[11] 4,451,851
[45] May 29, 1984

[54] AUTOMATIC DIAPHRAGM CONTROL DEVICE FOR A CLOSED CIRCUIT TELEVISION CAMERA

[75] Inventors: Masayuki Arai; Terumi Ogasawara, both of Nerima, Japan

[73] Assignee: Asahi Seimitsu Kabushiki Kaisha, Tokyo, Japan

[21] Appl. No.: 354,536

[22] Filed: Mar. 4, 1982

[30] Foreign Application Priority Data

Aug. 3, 1981 [JP] Japan .................. 56-121556

[51] Int. Cl.³ ............................................. H04N 5/26
[52] U.S. Cl. ................................................. 358/228
[58] Field of Search ....................................... 358/228

[56] References Cited

U.S. PATENT DOCUMENTS

3,691,302  9/1972  Gaebele et al. .................. 358/228

Primary Examiner—Richard Murray
Attorney, Agent, or Firm—Birch, Stewart, Kolasch & Birch

[57] ABSTRACT

An automatic diaphragm control device for with a closed circuit television camera is disclosed in which a video output signal from the television camera is applied to a polarity-inversible amplifier. The video output signal is then rectified by a voltage doubling rectifier and a DC voltage thereby obtained is compared with a separately provided reference voltage to form a diaphragm control signal. A voltage, which charges a capacitor responsible for voltage doubling in said rectifier, may be adjusted to achieve changeover of the light measuring mode so that the voltage doubling rectifier operates in an average mode when adjusted in the direction of the average light measuring mode relative to the initial state and operates in a peak mode when adjusted in the direction of the peak light measuring mode relative to the initial state.

9 Claims, 13 Drawing Figures

AUTOMATIC DIAPHRAGM CONTROL DEVICE FOR A CLOSED CIRCUIT TELEVISION CAMERA

BACKGROUND OF THE INVENTION

1. Field of the Invention

The present invention relates to an automatic diaphragm control device for closed circuit television camera utilizing a video output signal from the television camera

2. Description of the Prior Art

For the objective of automatic diaphragm control in a closed circuit television camera, a DC voltage is obtained from rectification of a video output signal, the DC voltage being used as a control signal to form an optimum picture. A rectifier is used to detect an object for pickup. The rectifier is the most important element, since the light measuring mode, for the above-mentioned objective, is determined by this rectifier.

In addition to the absolute brightness of the object for pickup, the ratio between the bright portion and the dark portion or the contrast value of this object also is one of important factors to obtain the optimum picture. In the natural world, the contrast value reaches a level as high as tens : one even under the cloudy sky and often reaches hundreds : one under the blue sky. In the television-reproduced picture, on the contrary, the contrast value is limited to an order of 30 through 40:1. Accordingly, it must be decided whether the bright portion or the dark portion should be used as the main object for pickup or light measuring when an object in general simultaneously contains both the bright portion and the dark portion, since it would be impossible to achieve the light measuring in said both portions at once.

Theoretically, the light measuring mode which is suitable for the case in which the dark portion is used as the main object to be light-measured may be referred to as the average light measuring mode while the light measuring mode which is suitable for the case in which the bright portion is used as the main object to be light-measured may be referred to as the peak light measuring mode. As the light measuring modes relying upon the video output signal from the television camera for diaphragm control, there have already been proposed the light measuring modes of two types as mentioned above. However, both of these well known modes still have problems. Specifically, when one and the same object for pickup simultaneously contains the bright portion and the dark portion as previously mentioned, the average light measuring mode would often make the bright portion a white solid portion without a gradient while the peak light measuring mode would often make the dark portion, which should be normally discriminable so far as the camera sensitivity is concerned, indiscriminable. In consequence, the objective to be used must be selected after careful examination of various factors of a particular object as far as the conventional device of the fixed photometric mode type is concerned.

SUMMARY OF THE INVENTION

It is a primary object of the present invention to overcome the inconvenience exhibited by the prior art by providing for an automatic diaphragm control device for use with a closed circuit television camera in which a video output signal from the television camera is applied to a polarity-inversible amplifier, then rectified by a voltage doubling rectifier and a DC voltage thereby obtained is compared with a separately provided reference voltage to form a diaphragm control signal, wherein a voltage, which charges a capacitor responsible for voltage doubling in said rectifier, may be adjusted to achieve changeover of the light measuring mode so that the voltage doubling rectifier operates in an average mode when adjusted in the direction of the average light measuring mode relative to the initial state and operates in a peak mode when adjusted in the direction of the peak light measuring mode relative to the initial state.

Further scope of applicability of the present invention will become apparent from the description given hereinafter. However, it should be understood that the details of the description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 6A:
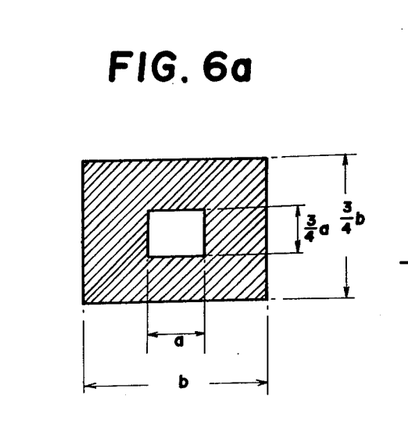
FIGS. 6a and 6b are diagrams illustrating a relationship between an object for pickup and the corresponding output signal waveform.
Figure 6B:
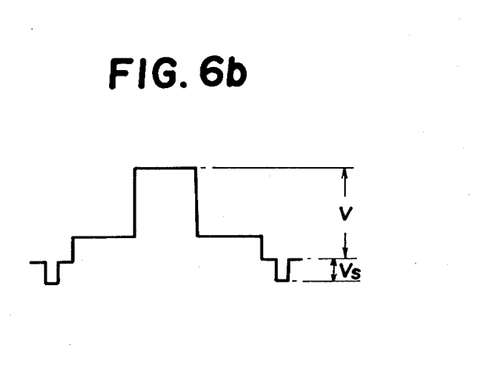

FIGS. 6a and 6b illustrate a specific object used to test the light measuring modes and a video output signal waveform obtained therefrom. FIGS. 7a through 7d illustrate characteristic curves representing a relationship between the video output signal $V_{IN}$ as shown by FIGS. 6a and 6b and the area ratio $S_o$. Referring to FIG. 6b, V designates the video signal and $V_s$ designates the compound video signal. The term "area ratio" used herein means a ratio of the bright portion in an overall picture and is expressed by a following formula.

$$S_o = (a/b)^2 \times 100 \, [\%]$$

Figure 7A:
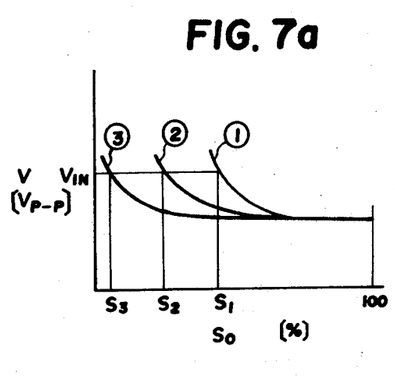
FIG. 7a is a diagram illustrating a relationship between the average light measuring mode and the contrast.
Figure 7B:
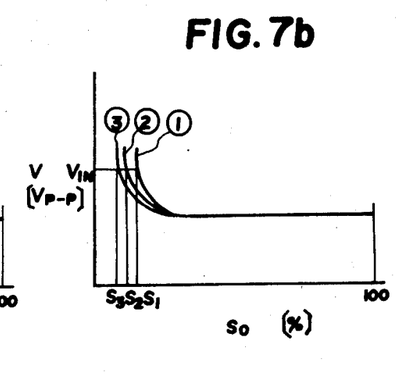
FIG. 7b is a diagram illustrating a relationship between the peak light measuring mode and the contrast.

It will be obviously understood from FIGS. 7a and 7b how said characteristic curves vary depending upon the contrast. FIG. 7a relates to the case of average light measuring mode while FIG. 7b relates to the case of peak light measuring mode. In FIGS. 7a and 7b, reference numeral (1) indicates a case of high contrast, (3) indicates a case of low contrast and (2) indicates a case of intermediate contrast relative to the previous two cases (1) and (3). It will be seen that the average light measuring mode is remarkably influenced by the contrast while the peak light measuring mode is only slightly influenced by the contrast. It will be also seen that, in the case (3) of low contrast, the characteristic curves extend over a range as far as to a point corresponding to the smallest value ($S_3$) of the area ratio ($S_o$) relative to the video output signal ($V_{IN}$) usually serving as a reference for selection of the appropriate modes both in the case of average light measuring mode and in the case of peak light measuring mode, so that both the modes can be utilized over a considerably extensive range so far as the case of low contrast is concerned.

Figure 7C:
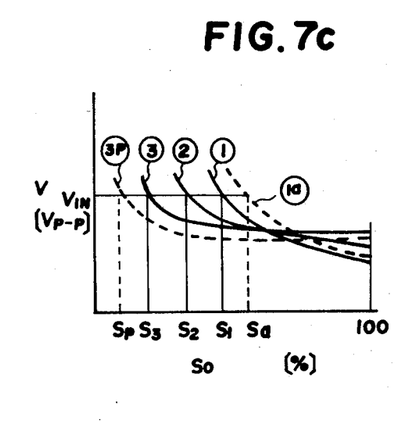
FIG. 7c is a diagram illustrating a difference between both light measuring modes with respect to a high contrast.
Figure 7D:
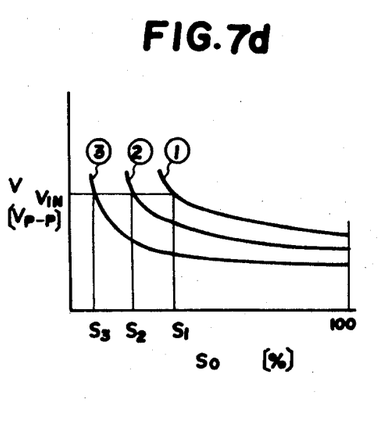
FIG. 7d is a diagram illustrating a difference between both light measuring modes with respect to a variation of the reference voltage level.

FIG. 7c shows curves characterizing the respective light measuring modes in the case of high contrast, in which the characteristic curve (1) relates to the average light measuring mode, the curve (3) relates to the peak light measuring mode and the curve (2) relates to the intermediate light measuring mode relative to these two modes. FIG. 7d shows variation of the characteristic curves as the level of the reference voltage varies. The curve (1) corresponds to the high level, the curve (2) corresponds to the intermediate level and the curve (3) corresponds to the low level.

In FIG. 7c, the respective video output signals are shown as deviating from one another at the position corresponding to the area ratio of 100% because the reference level of the video output signal has been initially adjusted (reference level) using the Test Chart according to the standard of Electronics Industries Association of Japan (EIAJ). Certainly this EIAJ Test Chart has more or less a contrast, but the area ratio of 100% represents, as previously mentioned, the state in which overall the picture is evenly bright with the contrast equal to 0. Said deviation is due to such a difference of contrast.

The curve (1) representing the average light measuring mode in FIG. 7c becomes more and more characteristic of this mode as plotted by the broken line (1a) in FIG. 7d as the reference level rises and the curve (3) representing the peak light measuring mode in FIG. 7c becomes more and more characteristic of this mode as plotted by the broken line (3P) in FIG. 7d as the reference level drops.

Considering the characteristics as has been described, the present invention proposes an arrangement adapted to, when it is desired to change a given initial light measuring condition in the direction of average light measuring, have the DC voltage after rectification lowered as if the reference level rises and, when it is desired to change said initial light measuring condition in the direction of the peak light measuring, to have the criterion level lowered so that the average light measuring mode would be more characteristic of this mode and the peak light measuring mode would be more characteristic of this mode.

Figure 1:
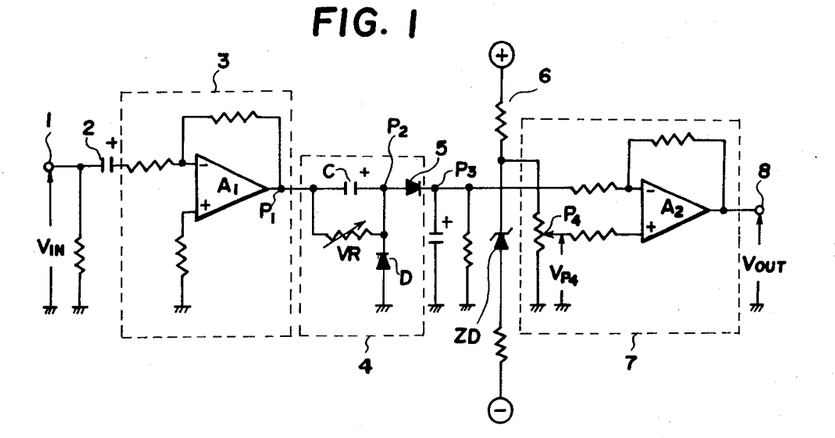
FIGS. 1 through 5 are circuit diagrams illustrating important parts of the embodiments of the present invention, respectively.

FIG. 1 is a circuit diagram schematically illustrating an embodiment of the present invention, wherein a reference numeral 1 designates an input terminal for an input signal $V_{IN}$ corresponding to a video output signal coming from a television camera. This input terminal 1 is connected via a capacitor 2 to a polarity-inversible amplifier 3 including an operational amplifier $A_1$ so that an inverted and amplified signal $VP_1$ free from a DC component may be obtained at its output terminal $P_1$. A voltage doubling rectifier 4 including a capacitor C for voltage doubling and a diode D for voltage doubling, the latter being serially connected to a zero voltage section, is connected to said output terminal $P_1$ so that an output signal $VP_2$ is obtained at a point $P_2$, then rectified by a diode 5 which provides, in turn, a DC voltage $VP_3$ at its output terminal $P_3$. The DC voltage $VP_3$ appearing at said output terminal $P_3$ is compared in a comparator 7 including an operational amplifier $A_2$ with a reference voltage $VP_4$ of a separately provided reference voltage circuit 6 to form a diaphragm control signal $V_{out}$ at an output terminal 8 as a result of this comparison. Said reference voltage circuit 6 is applied at a point $P_4$ with a voltage substantially stabilized by a Zener diode ZD as said reference voltage $VP_4$. In this embodiment illustrated by FIG. 1, a variable resistance VR is connected in parallel to the capacitor C for voltage doubling of the voltage doubling rectifier 4 to adjust a voltage with which said capacitor C is charged.

Figure 8:
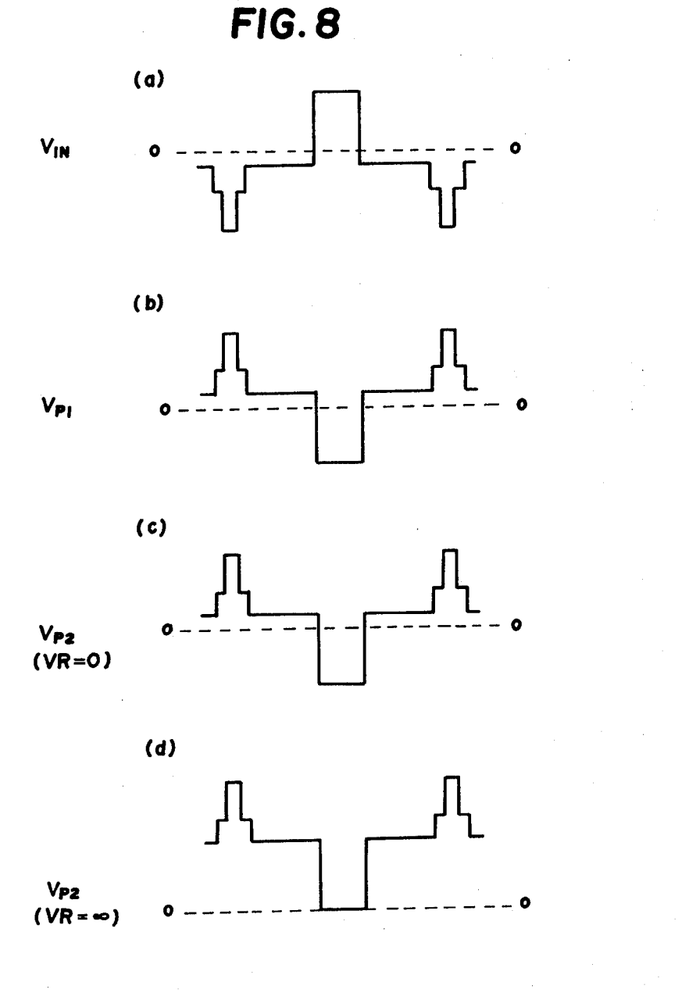
FIG. 8 is a diagram illustrating a relationship between the input signal and the output waveform in each circuit stage.

In the embodiment of the present invention arranged as above mentioned, it is assumed now that the input signal $V_{IN}$ of a waveform as illustrated by FIG. 8a corresponding to a test chart of FIGS. 6a and 6b is applied to the input terminal 1 as the video output signal. A rectangular portion extending at the plus side of this waveform corresponds to a bright portion of the picture. Said input signal $V_{IN}$ is inverted and amplified by the polarity-inversible amplifier 3 as shown by FIG. 8b and, as a result, the signal $VP_1$ appears at the output terminal $P_1$. This signal $VP_1$ contains no DC component under action of the capacitor 2 and the signal exhibits a stabilized state in which the positive area is equal to the negative area with respect to the line 0—0 in FIG. 8b. Assumed that the value of the variable resistance is adjusted to 0, the signal $VP_2$ appearing at the point $P_2$ on the output side of the voltage doubling capacitor C will be identical to the signal $VP_1$ appearing at said point $P_1$ as seen in FIG. 8c. This means that the base line (0—0) displaces as the amplitude varies so far as a width of the waveform corresponding to the bright portion remains sufficiently large, but such an influence of the variation in the amplitude becomes more and more negligible as said width of the bright portion is reduced so that the DC voltage $VP_3$ at the point $P_3$ after rectified as well maintained constant. More specifically, with the value of the variable resistance VR adjusted, the DC voltage $VP_3$ depends upon the average value of overall the video output signal and this corresponds to so-called average light measuring mode in which the dark portion is used as the main object for pickup. Now with the value of the variable resistance VR adjusted to infinity ($\infty$), the voltage doubling diode D is turned ON when applied with the minus portion of the signal $VP_1$ appearing at the output terminal $P_1$ to initiate charging of said capacitor C and then turned OFF with the subsequent plus portion which is added to the voltage previously charged in said capacitor C so that the output signal $VP_2$ appearing at the point $P_2$ is subjected to DC restoration as seen in FIG. 8d and a variation of the amplitude is detectable even when the width of the signal waveform corresponding to the bright portion is small. The case of the variable resistance VR being adjusted to infinity ($\infty$) corresponds to so-called peak light measuring mode in which the bright portion is used as the main object for pickup. It will be obvious from the foregoing description that, when the variable resistance VR takes an intermediate value, this resistance value limits the voltage with which said capacitor C can be charged and correspondingly the amplitude detectability when the width of the bright portion is reduced is also limited. Such condition corresponds to so-called intermediate light measuring mode. In other words, a light measuring condition having a limitation towards the peak mode is obtained when the maximum resistance value of the variable resistance VR connected in parallel to said capacitor C is adjusted to a value lower than infinity while a light measuring condition having such a limitation towards the average mode is obtained when a fixed resistance is connected in series with the variable resistance VR.

Figure 9:
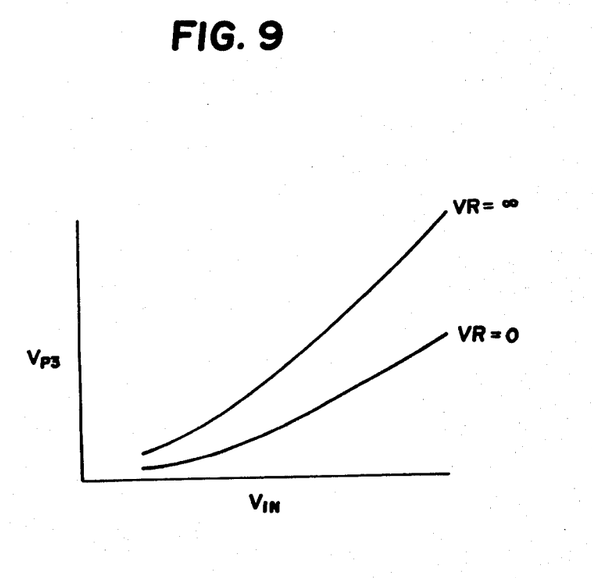
FIG. 9 is a diagram illustrating a relationship between the input signal and the DC voltage after rectification.

FIG. 9 shows characteristic curves representing the relation between the input signal $V_{IN}$ and the DC voltage $VP_3$ after rectified as a result of the test utilizing the EIJA Test Chart. A difference of DC voltage $VP_3$ in response to the input signal $V_{IN}$ or the optimal video output signal between the average light measuring mode and the peak light measuring mode is preferably adjusted to the difference of DC voltage generated in changeover of the light measuring mode, specifically in order of 0.05 $V_{p-p}$ as calculated in the video output signal level. When the value of said difference is excessively high, however, it will be difficult to relate the light measuring mode to the reference level and a trouble will be generated in practice.

Figure 2:
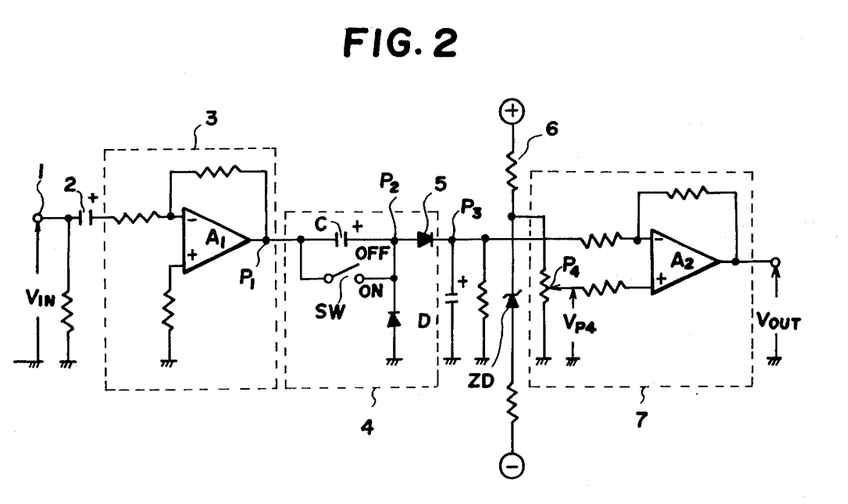
Figure 3:
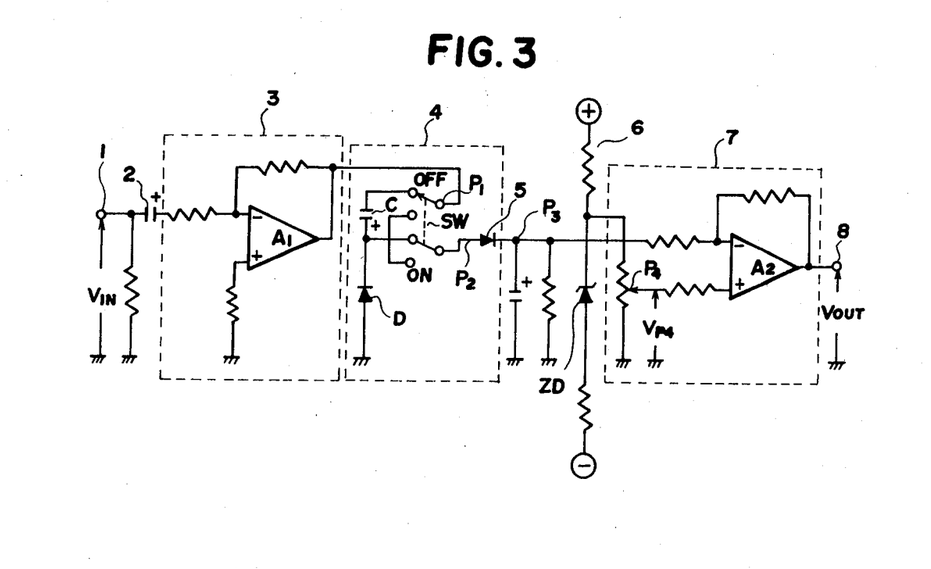

FIGS. 2 and 3 illustrate other embodiments of the present invention, wherein the variable resistance VR in the previous embodiment of FIG. 1 is replaced by a switch SW which is selectively turned ON and OFF in parallel to the voltage doubling capacitor C so that, when this switch SW is turned ON to close a switching circuit between the points $P_1$, $P_2$ with respect to said capacitor C, the circuit condition corresponds to the average light measuring mode in which said variable resistance VR takes the value of 0 and, when said switch SW is turned OFF, the circuit condition corresponds to the peak light measuring mode in which said variable resistance VR takes the value of infinite ($\infty$). In these embodiments, the light measuring mode is interchangeable by changeover of the switch SW between the average light measuring mode and the peak light measuring mode.

Figure 4:
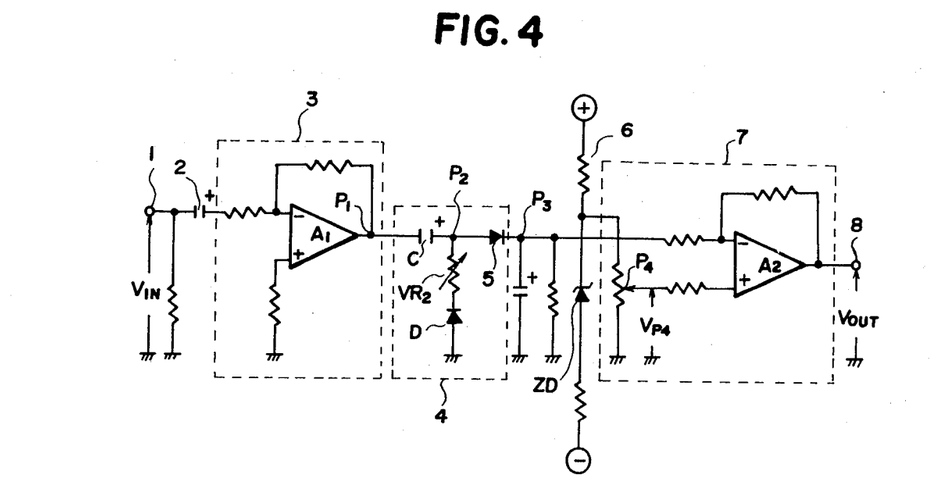

FIG. 4 illustrates still another embodiment of the present invention, wherein there is provided between the output terminal $P_2$ of the voltage doubling capacitor C and the voltage doubling diode D a variable resistance $VR_2$ so that, when the value of said variable resistance $VR_2$ is adjusted to 0, said diode is turned ON to provide the peak light measuring mode and, when the value of said variable resistance $VR_2$ is adjusted to infinite ($\infty$), said diode remains non-conductive so as to provide the average light measuring mode in which no charging of the voltage doubling capacitor C with the minus portion of the signal $VP_1$ appearing at the point $P_1$ occurs. With the value of said variable resistance $VR_2$ being adjusted to an intermediate value, an intermediate light measuring mode is obtained with respect to the average light measuring mode and the peak light measuring mode.

Figure 5:
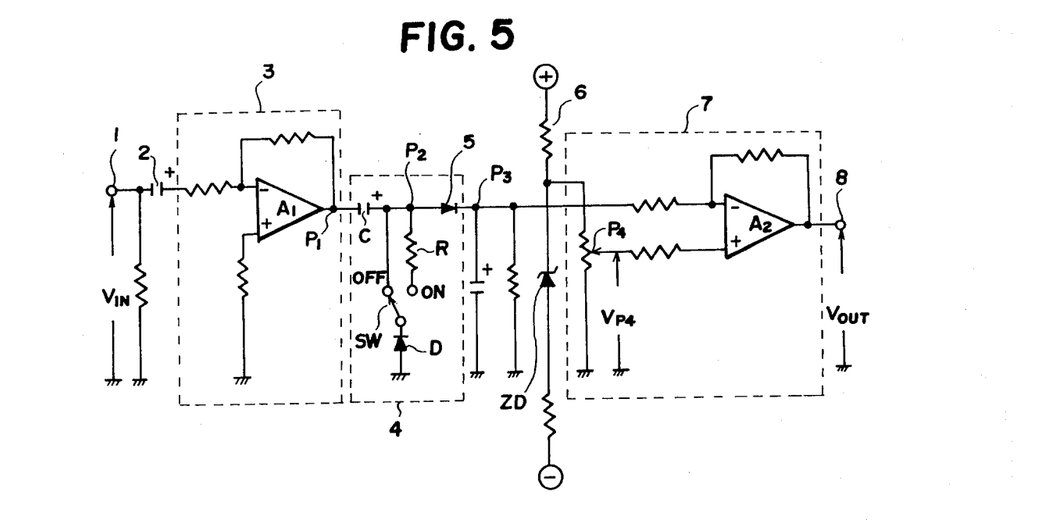

FIG. 5 illustrates further another embodiment of the present invention, wherein the variable resistance $VR_2$ as shown in FIG. 4 is replaced by a switch SW interposed between the output terminal of said capacitor C and said diode D so that, when said switch SW is set to the conductive position (position OFF in FIG. 5), the peak light measuring mode is obtained and, when said switch SW is set to the other position (position ON in FIG. 5) at which a conduction is effected via a fixed resistance R, the average light measuring mode is obtained, in which the charge voltage of the voltage doubling capacitor C is limited by said fixed resistance R.

As it will be obvious from the foregoing description, the present invention provides the automatic diaphragm control device for closed circuit television camera in which the video output signal coming from the television camera is applied to the polarity-inversible amplifier, then rectified by the voltage doubling rectifier and the DC voltage thereby obtained is compared with the separately provided reference voltage to form a diaphragm control signal, wherein the voltage with which the voltage doubling capacitor of the voltage doubling rectifier is charged is regulated by operating the variable resistance or the switch provided in parallel to said capacitor or by operating the variable resistance or the switch provided in series with the voltage doubling diode so that changeover of said voltage doubling rectifier between the average light measuring mode and the peak light measuring mode is effected and said average light measuring mode can be more characteristic of this mode without being affected by the output signal corresponding to a small width of the bright portion while the peak light measuring can be adjusted so as to be more characteristic of this mode since said small width of the bright portion is well detectable. Accordingly, the device of this invention may be used under the condition of high contrast as in the natural world to enlarge the range within which the light measuring can be effectively done.

Obviously it is also possible to arrange the device according to the present invention so that the variable resistance or the switch permitting the changeover of said voltage doubling rectifier between the average light measuring mode and the peak light measuring mode may be remote-controlled by means of prior art.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

What is claimed is:

1. An automatic diaphragm control device for use with a closed circuit television camera, said television camera producing a video output signal, comprising:
polarity inversible amplifier means responsive to said video output signal for inverting and amplifying said video output signal thereby producing an inverted video output signal;
voltage doubling rectifier means connected to said polarity inversible amplifier means for rectifying said inverted video output signal thereby producing a DC voltage, said voltage doubling rectifier means including voltage doubling means for providing a voltage doubling function and adjusting means connected in parallel with the voltage doubling means for adjusting the voltage across said voltage doubling means thereby effecting changeover of said voltage doubling rectifier means between an average light measuring mode and a peak light measuring mode whereby said voltage doubling rectifier operates in an average mode when set in the average light measuring mode and operates in a peak mode when set in the peak mode; and comparator means responsive to said DC voltage and to a separately provided reference voltage for comparing the DC voltage with the reference voltage and for developing a diaphragm control signal in response thereto.

2. An automatic diaphragm control device in accordance with claim 1 wherein said voltage doubling means comprises a capacitor and a diode.

3. An automatic diaphragm control device in accordance with claim 2 wherein said adjusting means comprises a variable resistance connected in parallel with said capacitor.

4. An automatic diaphragm control device in accordance with claim 2 wherein said adjusting means comprises a switch connected in parallel with said capacitor.

5. An automatic diaphragm control device in accordance with claim 1 wherein said voltage doubling means comprises a diode.

6. An automatic diaphragm control device in accordance with claim 2 wherein said adjusting means comprises a variable resistance connected in series with said diode.

7. An automatic diaphragm control device in accordance with claim 2 wherein said adjusting means comprises a switch connected in series with said diode.

8. An automatic diaphragm control device in accordance with claim 3 or 6 wherein said variable resistance is remotely controllable.

9. An automatic diaphragm control device in accordance with claim 4 or 7 wherein said switch is remotely controllable.

* * * * *